US005455912A

United States Patent [19]
Ludwig

[11] Patent Number: 5,455,912
[45] Date of Patent: Oct. 3, 1995

[54] HIGH SPEED/LOW OVERHEAD BUS ARBITRATION APPARATUS AND METHOD FOR ARBITRATING A SYSTEM BUS

[75] Inventor: Thomas E. Ludwig, Irvine, Calif.

[73] Assignee: Vtech Industries, Inc., Wheeling, Ill.

[21] Appl. No.: 79,626

[22] Filed: Jun. 18, 1993

[51] Int. Cl.$^6$ ................................................. G06F 3/00
[52] U.S. Cl. .......................... 395/293; 395/285; 395/728
[58] Field of Search ..................................... 395/325, 725; 370/85.6; 340/825.5

[56] References Cited

U.S. PATENT DOCUMENTS

| | | | |
|---|---|---|---|
| 4,050,097 | 9/1977 | Miu et al. | 395/325 |
| 4,229,791 | 10/1980 | Levy et al. | 395/325 |
| 4,257,095 | 3/1981 | Nadir | 395/325 |
| 4,270,167 | 5/1981 | Koehler et al. | 395/325 |
| 4,375,639 | 3/1983 | Johnson, Jr. | 340/825.5 |
| 4,591,975 | 5/1986 | Wade et al. | 395/725 |
| 4,667,191 | 5/1987 | Comroe et al. | 340/825.5 |
| 4,698,753 | 10/1987 | Hubbins et al. | 395/325 |
| 4,703,420 | 10/1987 | Irwin | 395/800 |
| 4,787,033 | 11/1988 | Bomba et al. | 395/325 |
| 4,841,178 | 6/1989 | Bisson | 307/518 |
| 5,003,463 | 3/1991 | Coyle et al. | 395/275 |
| 5,005,151 | 4/1991 | Kurkowski | 395/325 |
| 5,045,998 | 9/1991 | Begun et al. | 395/325 |
| 5,125,080 | 6/1992 | Pleva et al. | 395/325 |
| 5,261,109 | 11/1993 | Cadambi et al. | 395/725 |
| 5,280,591 | 1/1994 | Garcia et al. | 395/325 |
| 5,297,260 | 3/1994 | Kametani | 395/325 |
| 5,313,591 | 5/1994 | Averill | 395/325 |

OTHER PUBLICATIONS

Intel486 SX Microprocessor Databook, pp. 1–6; 16–21; 89–103; 113–145 (Intel Corporation,. Santa Clara, Calif., Aug. 1992).
Intel486 DX2 Microprocessor Databook, pp. i–vii; 1–4 to 1–9; 6–1 to 6–11; 7–7 to 7–30; 14–1 to 14–4 (Intel Corporation, Santa Clara, Calif., Jul. 1991).

Primary Examiner—Jack B. Harvey
Assistant Examiner—Paul R. Myers
Attorney, Agent, or Firm—Dick and Harris

[57] ABSTRACT

A high speed/low overhead bus arbitration apparatus for allocating system bus mastership in a system containing two processing devices. The apparatus includes control logic which controls the access of each of the processing devices to the system bus. The apparatus further includes a multiplexer for selecting the control information presented on the system bus based upon the state of the control logic. The apparatus finally includes a latch for alternatively passing through to and latching onto the system bus, based upon the state of the control logic, an address, which is driven by only one of the processing devices. The control logic transfers access to the system bus from the first processing device to second when the second requests access and the bus is not busy, preventing both processing devices from contending for the system bus by forcing the driving processor device to relinquish the address lines prior to completion of the current bus cycle. The control logic further transfers access to the system bus back to the first processing device when the first requests access and the bus is not busy.

26 Claims, 4 Drawing Sheets

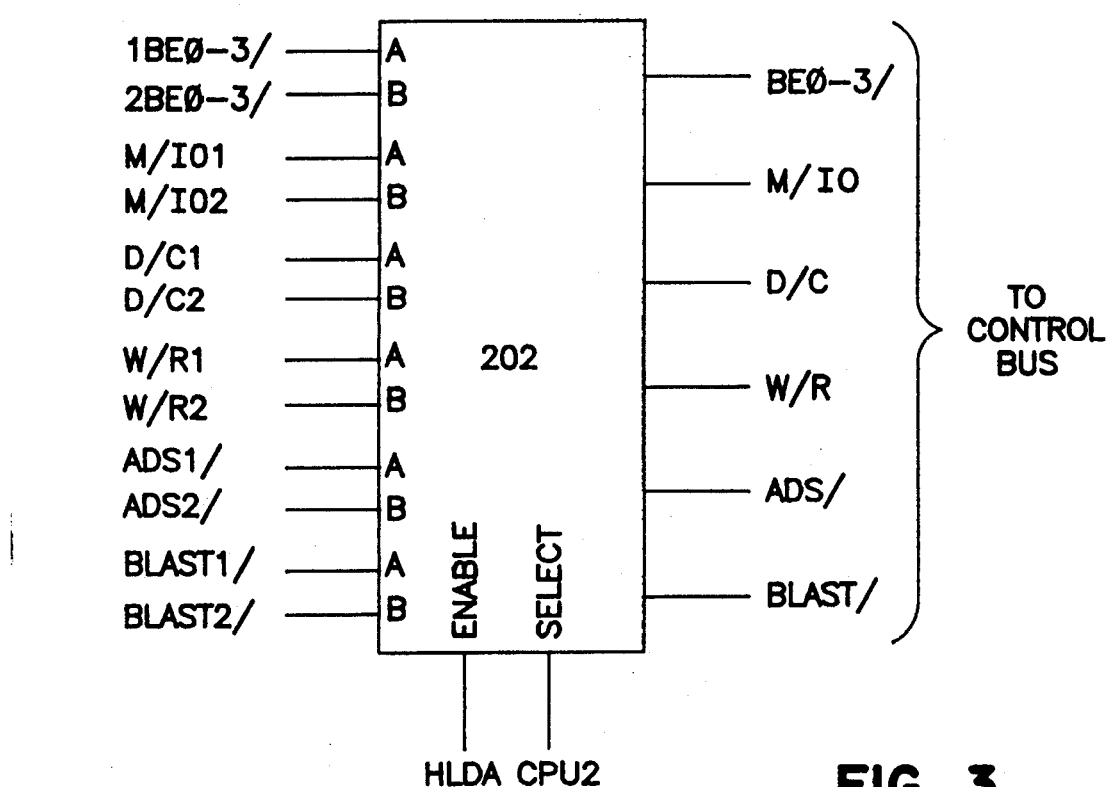
FIG. 3
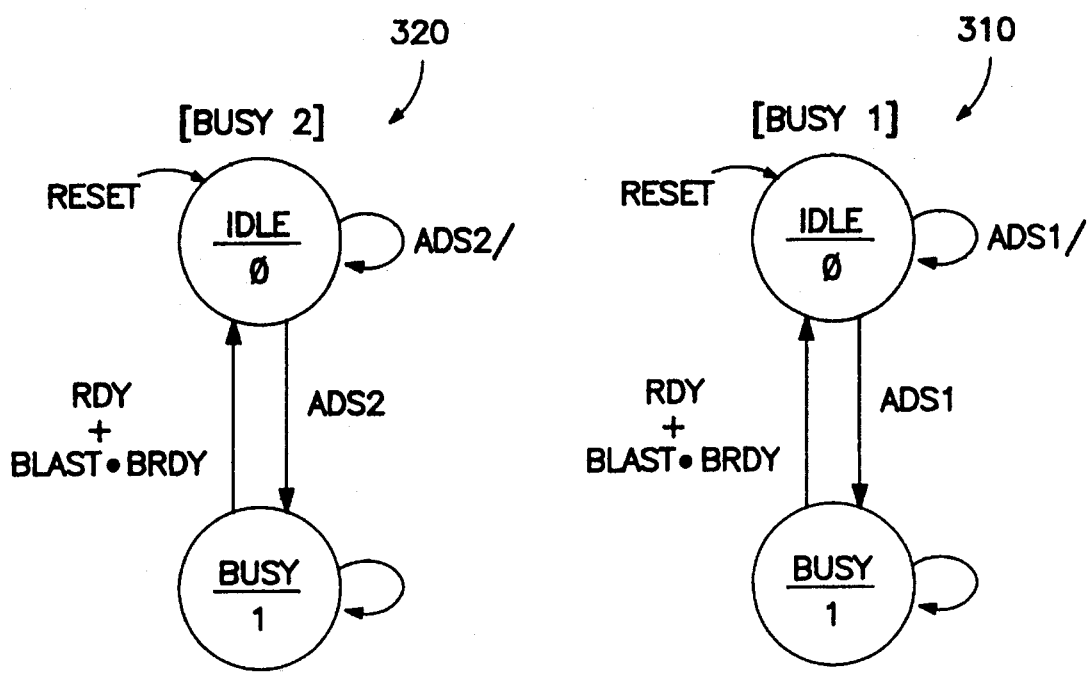
FIG. 5
FIG. 6

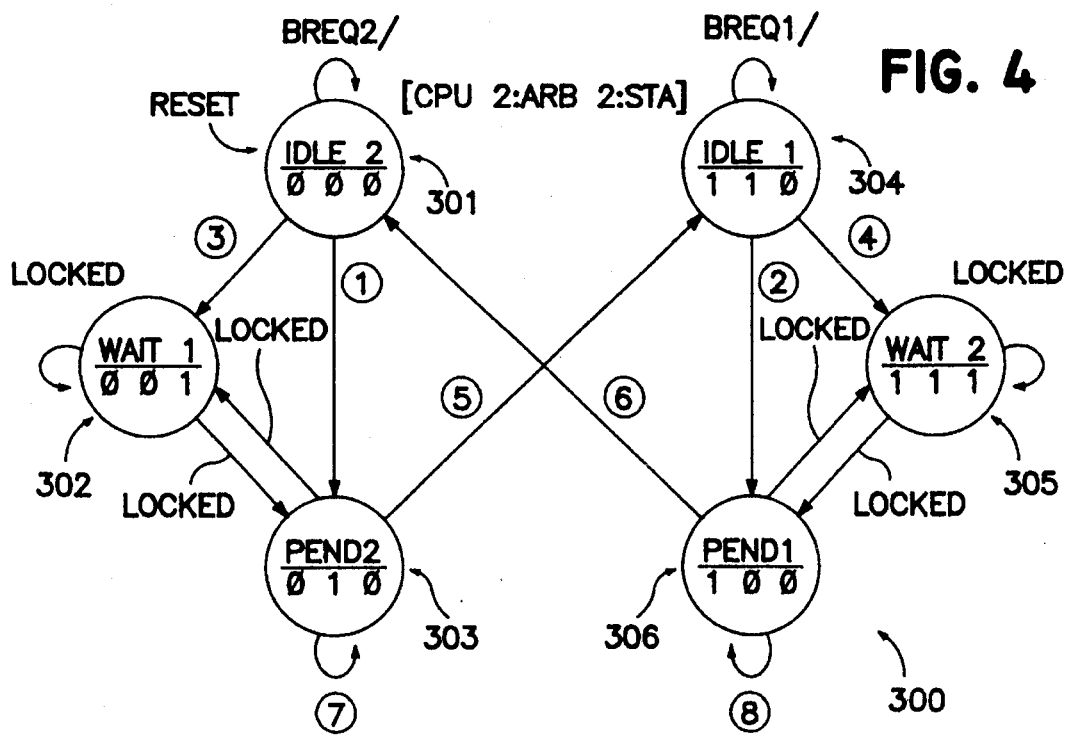

FIG. 4

LOCKED=LOCK+PLOCK BLAST

① BREQ2·LOCKED/

② BREQ1·LOCKED/

③ BREQ2·LOCKED

④ BREQ1·LOCKED

⑤ BUSY1·RDY·LOCKED/+BUSY1·BRDY·BLAST·LOCKED/+ BUSY1/·ADS2/·LOCKED/

⑥ BUSY2·RDY·LOCKED/+BUSY2·BRDY·BLAST·LOCKED/+ BUSY2/·ADS2/·LOCKED/

⑦ BUSY/·RDY/·BRDY/·LOCKED/+BUSY/·RDY/·BLAST/· LOCKED/+BUSY/·ADS/·LOCKED/

⑧ BUSY2·RDY/·BRDY/·LOCKED/+BUSY2·RDY/· BRDY/·LOCKED/+BUSY2/·ADS2·LOCKED/

HIGH SPEED/LOW OVERHEAD BUS ARBITRATION APPARATUS AND METHOD FOR ARBITRATING A SYSTEM BUS

BACKGROUND OF THE INVENTION

1. Field of Invention

The present invention relates in general to a multiprocessor computer system and, in particular, to a method and apparatus for high speed, low overhead system bus arbitration between two processing devices, wherein each of the processing devices may comprise a microprocessor or a lesser device, such as a SCSI interface, math co-processor, or the like.

2. Background Art

Multiprocessor computers have long been known in the art. These computers have taken on numerous forms, such as processor/coprocessor, symmetric microprocessors, asymmetric microprocessors and microprocessor/DMA controllers. Wide spread use of Symmetric and asymmetric multiprocessing has been rather prohibitive due to the associated costs incurred as a result of the special requirements of such a system, including the requirement for custom designed processors for a multiprocessing environment, in turn, requiring custom applications for these systems. The converse of multiprocessor systems are, of course, uniprocessor computers.

The most popular and widely distributed uniprocessor systems utilize in their designs the INTEL 486 family of microprocessors (486SX, 486DX, 486DX2 and OverDrive processors), produced by the INTEL CORPORATION of Santa Clara, Calif. The cost of these processors is relatively inexpensive particularly when compared with specialty multiprocessor computer processors. Furthermore, because of the proliferation of INTEL based computers, software availability is very good. These elements have combined to make the INTEL 486 a 'defacto' standard in the computer industry.

As a result of the popularity of the INTEL 486 family, the 486 bus definition, i.e. the defined signals and their timing, have become an industry standard with more and more chip set and peripheral manufacturers designing their products to work within this definition. Some more pertinent signals available in the bus definition include:

- BREQ—The internal cycle pending signal indicates that the microprocessor has internally generated a bus request. BREQ is generated whether or not the microprocessor is driving the bus.
- RDY/—The non-burst ready input indicates that the current bus cycle is complete. RDY/ indicates that the external system has presented valid data on the data pins in response to a read or that the external system has accepted data from the microprocessor in response to a write. RDY/ is ignored when the bus is idle and at the end of the first clock of the bus cycle.
- BRDY/—The burst ready input performs the same function during a burst cycle that RDY/ performs during a non-burst cycle. BRDY/ is ignored when the bus is idle and at the end of the first clock in a bus cycle. BRDY/ is sampled in the second and subsequent clocks of a burst cycle.
- BLAST/—The burst last signal indicates that the next time BRDY/ is returned the burst bus cycle is complete.
- LOCK/—The bus lock pin indicates that the current bus cycle is locked. LOCK/ goes active in the first clock of the first locked bus cycle and goes inactive after the last clock of the last locked bus cycle. The last locked cycle ends when ready is returned.
- PLOCK/—The pseudo-lock pin indicates that the current bus transaction requires more than one bus cycle to complete. Examples of such operations are floating point long reads and writes (64 bits), segment table descriptor reads (64 bits), in addition to cache line fills (128 bits). The microprocessor will drive PLOCK/ active until the addresses for the last bus cycle of the transaction have been driven regardless of whether RDY/ or BRDY/ have been returned.
- ADS/—The address status output indicates that a valid bus cycle definition and address are available on the cycle definition lines and address bus. ADS/ is driven active in the same clock as the addresses are driven.
- EADS/—This signal indicates that a valid external address has been driven onto the microprocessor address pins. This address will be used to perform an internal cache invalidation cycle.
- M/IO, D/C, W/R—The bus definition signals are not driven during bus hold and follow the timing of the address bus.

Attempts have been made to interconnect 486 type microprocessors utilizing the 486 bus definition with some limited success. Many of the problems which are typically experienced are due to under utilization of bus cycles and/or existence of bus contention problems—typically resulting in less than optimum performance for the investment required.

It is thus an object of the present invention to provide a multiprocessor computer system utilizing commonly developed processing devices, such as the INTEL 486 family of microprocessors.

It is a further object to provide high speed, low overhead bus arbitration, while minimizing the need for additional, custom logic so as to minimize the cost of such a multiprocessor computer system.

It is yet a further object of the present invention to provide for a multiprocessing computer system having the ability to use commonly available software packages.

These and other objects will become apparent in light of the attached specification, drawings and claims.

SUMMARY OF THE INVENTION

In a preferred embodiment, the present invention comprises a high speed/low overhead bus arbitration apparatus for allocating system bus mastership and method for performing same. The present apparatus may be deployed in—or be an integral part of—a system including first and second processing devices and bus means for providing a central communication link between devices within the system. The bus means includes an address bus, a data bus, and a control bus.

Both the first and second processing devices execute instructions and manipulate data. The first and second processing devices may each comprise a microprocessor and, in particular, a microprocessor from the INTEL family of 486 microprocessors, or the like. The first and/or second processing devices may comprise other types of devices such as I/O controllers or math coprocessors. Each of these devices may receive interrupts from an interrupt controller.

The first processing device has a first set of address lines, a first set of data lines and a first set control lines. The second processing device has a second set of address lines, a second set of data lines and a second set control lines. The ordering of the first and second sets and bus means signals is identical, such that messages can be carried throughout the system.

In a preferred embodiment, the bus arbitration apparatus includes control means, multiplexer means and latch means, all of which serve to arbitrate between the first and second processing devices, such that each processing device may gain access to the bus means when the bus means is not busy. The control means controls the connections between each of the first and second processing devices and the address bus and control bus on the bus means. In this embodiment, the first and second sets of data lines are directly connected onto the bus means.

The multiplexer means connects either the first or second set of control lines to the control bus. Such selection is based upon the state of the control means, such that only the first or second processing device may have control of the system at any one time.

The latch means alternatively passes through to or latches onto the address bus, based upon the state of the system, an address. The address is driven exclusively by either the first or the second processor device based upon the state of the control means. The control means insures that there is no contention between a first address driven by the first processor device on the first set of address lines for a first time interval and a second address driven by the second processor device on the second set of address lines for a second, contiguous time interval.

In operation, the bus arbitration apparatus, begins by providing the first processing device access to the bus means. During such time as a processing device has access to the bus means it may or may not utilize the bus means. If the bus means is utilized it is considered "busy" by the apparatus until the bus cycle has completed or is about to complete. The apparatus determines whether the bus means is busy by utilizing signals from the first processing device and the bus means.

While the first processing device has access to the bus, the apparatus latches the address on the first set of address lines into the latch on every bus cycle, such that the proper bus definition is maintained for the entire bus cycle. Then the apparatus causes the first processing device to immediately relinquish the first set of address lines. Thus, the first processing device is allowed to complete the current bus cycle while the first set of address lines "settle down" within their specified hold time.

These steps are repeated until the bus means is not busy and the second processing device requests access to the bus means. When the second processing device requests such access, the apparatus prevents the first processing device from beginning a subsequent bus cycle. This step, as well as the step of relinquishing the address lines is achieved, in a preferred embodiment utilizing INTEL 486 microprocessors, using the AHOLD signal. As long as AHOLD is asserted on the first processor it can not begin a bus cycle, thus providing the second processing device exclusive access to the bus means. Of course, while the first processing device had access to the bus means, AHOLD was continually asserted upon the second processing device to prevent the second processing device from beginning a bus cycle.

The AHOLD signal is 'designed into' the 486 microprocessor by the INTEL CORPORATION and is intended to work in combination with the EADS signal to provide the ability to invalidate the internal cache found in the 486 microprocessor family. The present apparatus thus utilizes AHOLD in a non-intended manner to provide bus arbitration, however, the apparatus also provides for AHOLD to be used for its intended function when a cache invalidation cycle is required. To this end, in a preferred embodiment of the invention, the apparatus further includes cache invalidation means which assures that the EADS signal is only provided to the first and second processing devices when cache invalidation may be required. Thus, AHOLD may be utilized within a preferred embodiment without sacrificing the ability to invalidate the cache. In this embodiment, the address lines of the first and second processing devices may be tied together on the non-bus means side of the latch means, so as to allow for potential cache invalidations between the first and second processing devices. Also in a preferred embodiment, the latch means is bidirectional, such that operations by other system masters, such as a DMA controller can result in an internal cache invalidation in the first and/or second processing devices.

BRIEF DESCRIPTION OF THE DRAWINGS

FIG. 3 of the drawings is a detailed block diagram of the multiplexer means showing, in particular, the arrangement of signals utilized in an embodiment conforming to the INTEL 486 bus definition;

FIG. 4 of the drawings is a state machine diagram of a portion of the control means utilized in an embodiment conforming to the INTEL 486 bus definition;

FIG. 5 of the drawings is a state machine diagram of a portion of the control means utilized in an embodiment conforming to the INTEL 486 bus definition; and FIG. 6 of the drawings is a state machine diagram of a portion of the control means utilized in an embodiment conforming to the INTEL 486 bus definition.

DETAILED DESCRIPTION OF THE DRAWINGS

Figure 1:
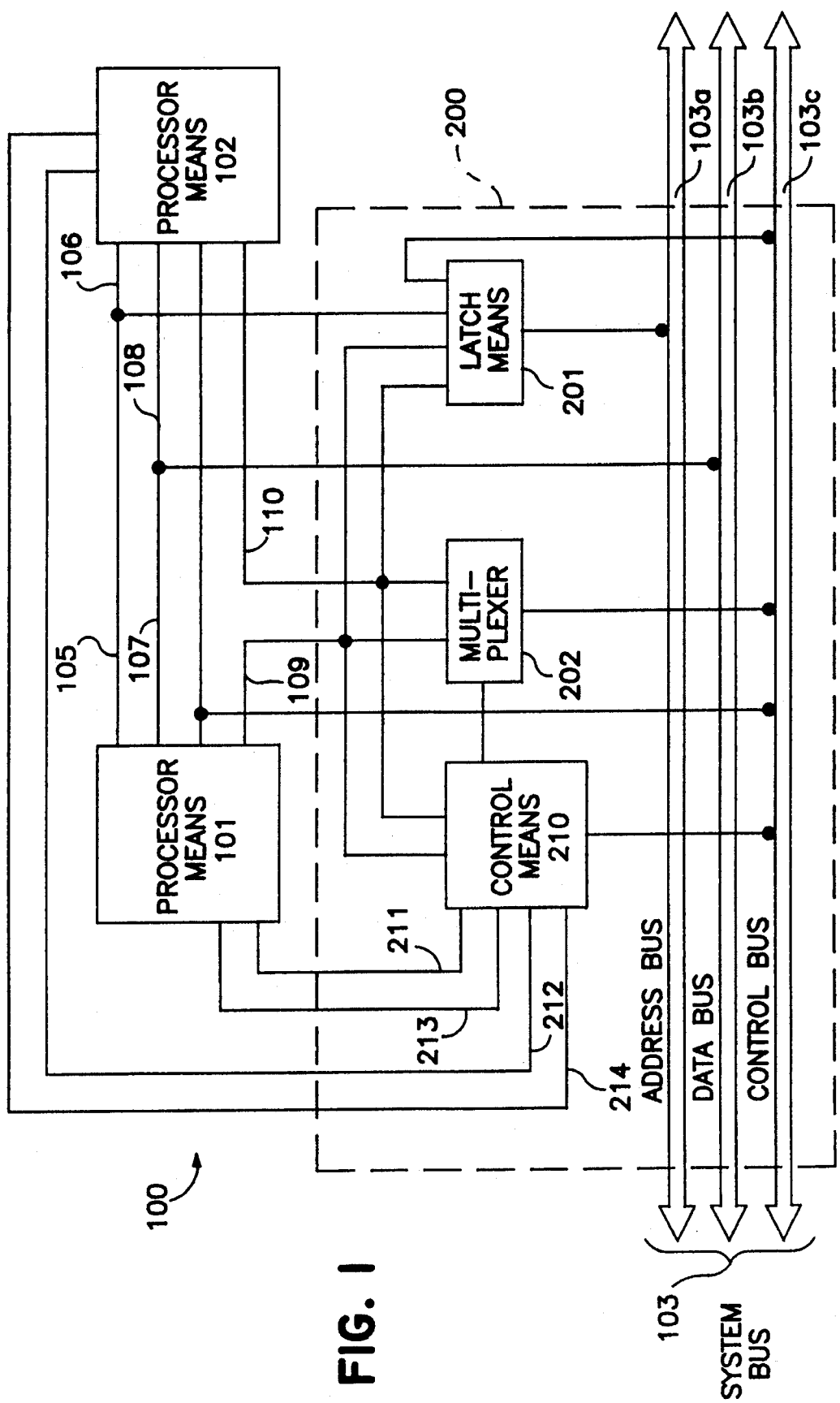
FIG. 1 of the drawings is a block diagram of the multi-processor computer system including the high speed/low overhead bus arbitration apparatus showing, in particular, first and second processor means, multiplexer means, latch means, control means and bus means.

While this invention is susceptible of embodiment in many different forms, one specific embodiment is shown in the drawings and will herein be described in detail with the understanding that the present disclosure is to be considered as an exemplification of the principals of the present invention and is not intended to limit the invention to the embodiment illustrated.

FIG. 1 of the drawings is a block diagram of multiprocessor computer system 100. Multiprocessor system 100 includes first processor means 101, second processor means 102, bus means 103 and high speed/low overhead bus arbitration apparatus 200.

Both first processor means 101 and second processor means 102 execute instructions and manipulate data. First and second processor means 101 and 102 may both comprise microprocessors from the INTEL 486 family, available from INTEL CORPORATION of Santa Clara, Calif. However, it is also contemplated that first and second processor means 101 and 102 may comprise any processing device that can independently access memory address locations and can further be halted at the end of a bus cycle, such as I/O controllers.

First processor means 101 has first set of address lines 105, first set of data lines 107 and first set control lines 109. Second processing means 102 has second set of address lines 106, second set of data lines 108 and second set control lines 110. In a preferred embodiment; first set and second set of data lines 107 and 108 are electrically connected together and to data bus 103b.

Bus means 103 provides a central communication link between devices within the entire system, which may further include main memory, an external cache memory and controller, storage devices and other processing devices found within personal computer systems. Bus means 103 includes address bus 103a, data bus 103b, and control bus 103c. The width of address bus 103a and data bus 103b are a matter of solely design choice, with a standard 486 address bus being 32 bits wide and a standard data bus also being 32 bits wide. The width of control bus 103c is also matter of design choice, however, certain limitations apply to control bus 103c so as to facilitate the functionality of high speed/low overhead bus arbitration apparatus 200.

In particular, the bus definition of the INTEL 486 microprocessor family, as described above, is more than sufficient to facilitate the functionality of high speed/low overhead bus arbitration apparatus 200. In fact, only a subset of the full 486 bus definition is necessary to the operation of high speed/low overhead arbitration apparatus 200. This subset includes the following signal types:

- processing device bus request—a signal indicating that a particular processing device desires control of the bus means;
- valid cycle ready—a signal asserted at the beginning of a first tick cycle indicating that the controlling processing device has output a valid cycle definition (valid address, valid command (read/write)) onto its pins;
- bus means locked—a signal asserted simultaneous to the valid cycle ready signal and continuing until cycle completion, indicating that the current bus cycle can not be interrupted;
- cycle completion—a signal or set of signals asserted at the end of a second tick cycle, indicating that the current bus cycle is completing;
- address bus request—a signal which causes the particular processing device to immediately relinquish the address bus portion of the bus means, while continuing to complete its current bus cycle by maintaining the data bus and control bus as required by the cycle definition and preventing a subsequent bus cycle; and
- command definition—one or more signals indicating the desired bus operation, such as memory read and memory write.

As in any bus definition, these signals must conform to various setup and hold times which are device dependent. Given the variety of potential devices which may be utilized within the present invention, these setup and hold times may vary, as would be understood by one with ordinary skill in the art with reference to the manufacturer's specification for each particular device.

High speed/low overhead bus arbitration apparatus 200 allocates mastership of bus means 103 between first and second processor means 101 and 102. This, does not however, prevent either first or second processor means 101 or 102 from relinquishing bus means 103 to an external master, such as an I/O controller (not shown). High speed/low overhead bus arbitration apparatus 200 comprises latch means 201, multiplexer means 202 and control means 210. Latch means 201 alternatively passes through to or latches onto address bus 103a, based upon the state of control means 210, the address being driven exclusively by either the first or the second processor means 101 or 102. Latch means 201 further includes synchronous logic for controlling the latching of an address onto said latch means. This synchronous logic may be constructed from discrete logic or implemented in a PAL, such as a 16R4 GAL. The function may be implemented as follows:

LATCH_ADDRESS=LATCH_ADDRESS/* ADS+ LATCH_ADDRESS * RDY/* BRDY/+LATCH_ADDRESS * RDY/* BLAST/

Essentially, the equation results latching the address on the input of latch means 201 when ADS is asserted and keeping that address latched until the end of the bus cycle, as indicated by RDY, BRDY and BLAST.

Where first processor means 101 and/or second processor means 102 comprise a microprocessor having an internal cache, latch means 201 may comprise a bi-directional latch, such that an address generated by external bus master, such as an I/O interface, may be presented to first and second processor means resulting in possible invalidation of the internal cache. In this embodiment, the direction of the latch means 201 is determined by asserting the HLDA signal on the direction control of latch means 201.

Multiplexer means 202, which may comprise a 74 FCT 257 type device, connects either first set of control lines 109 or second set of control lines 110 to control bus 103c, depending upon the state of control means 210. FIG. 3 is a detailed block diagram of multiplexer means 202 showing the arrangement of signals in an embodiment utilizing the INTEL 486 bus signal definition. The signals connected to control bus 103c are dependent upon the value of CPU2. CPU2 is generated by control means 210, such that while first processor means 101 is bus master the signals on first set of control lines 109 (indicated by "1" designation in the signal names) are connected to control bus 103c.

Figure 2:
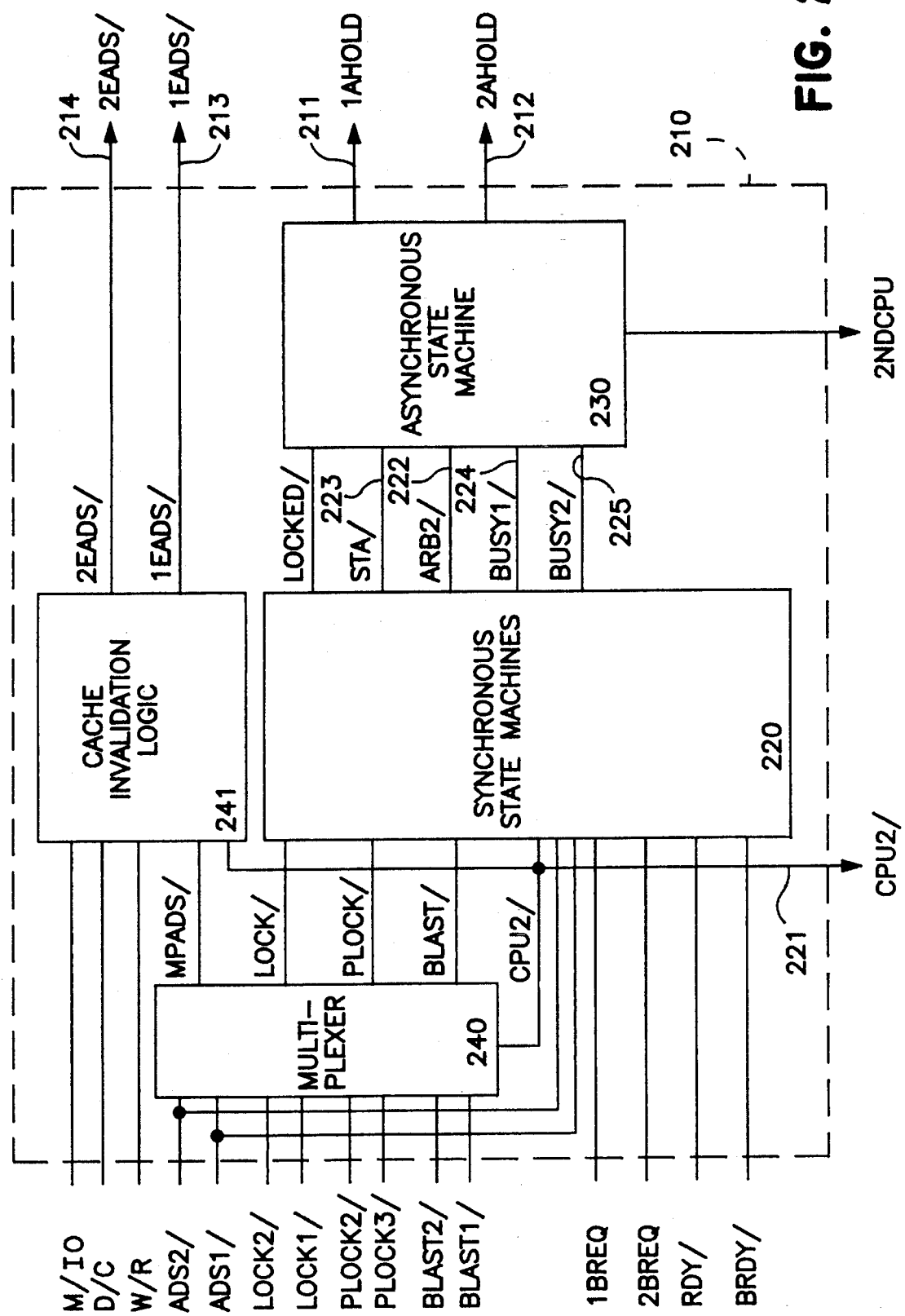
FIG. 2 of the drawings is a block diagram of the control means of the present invention showing, in particular, cache invalidation logic, synchronous and asynchronous state machines and a signal multiplexer.

FIG. 2 is a block diagram of control means 210 of high speed/low overhead bus arbitration apparatus 200. Control means 210 includes synchronous state machines 220, asynchronous state machines 230; signal multiplexer 240 and cache invalidation means 241. Control means 210 controls the connections between each of first and second processing means 101 and 102 and address bus 103a and control bus 103c.

Signal multiplexer connects either a portion of first set of control lines 109 or a portion of second set of control lines 110 to synchronous state machines 220 and cache invalidation means 241 depending upon the value of CPU2/221.

In a preferred embodiment, control means 210 is implemented using multiple state machines, however, the inventor contemplates other approaches to providing control signals, such that each processor means may have access to bus means 103 when desired and bus means 103 is not busy as being within the scope of the present invention. Synchronous state machines 220 consists of three state machines, a preferred embodiment of which is shown in FIGS. 4, 5 and 6 of the drawings. In this embodiment, the INTEL 486 bus definition is utilized and thus the logic equations are represented using INTEL signal definitions, with the understanding that any signals with similar functionality may be substituted for the identified signals.

Although three synchronous state machines are used in a preferred embodiment of the invention the logic could have been implemented in one larger state machine, multiple state machines provide a simpler design for the overall set of variables. Each of these state machines may be implemented on one or more PALs, such as a GAL22V10, which may be programmed utilizing a CUPL compiler. It is also possible to implement these state machines utilizing discrete logic. In either event, where first processor means 101 comprises an INTEL 486 DX/2 66 Mhz microprocessor, the allowable maximum delay between input and output is less than or equal to 5 nanoseconds. Of course, the slower the slowest processor means the greater the allowable delay between input and output.

FIG. 4 is state diagram showing synchronous state machine 300 designed for an INTEL 486 type bus definition. Synchronous state machine 300 has three output variables: CPU2 221, indicates which processing means currently has access to bus means 103; ARB2 222, indicates whether the other processor means has requested to be bus master and STA 223, an independent variable. These three variables are used to define only six states: IDLE2 301; WAIT1 302; PEND2 303; IDLE1 304; WAIT2 305 and PEND1 306. Transitions between states are triggered by various control signals found on control bus 103c.

In general, synchronous state machine 300 provides first processor means 101 access to bus means 103 while in states IDLE2 301; WAIT1 302 and PEND2 303 and provides second processor means 102 access to bus means 103 while in states IDLE1 304; WAIT2 305 and PEND1 306.

The values for CPU2 221, ARB2 222 and STA 223 are shown in FIG. 4 for each state. For instance, in WAIT2 305 CPU2 is HIGH, ARB2 is HIGH and STA is HIGH. Thus indicating that control signals are from second processor means 102 and that second processor means still desires access to bus means 103. As shown in FIG. 2, CPU2 221 is fed directly into the select pin of multiplexer means 202, so as to control the source of the control signals. Upon system reset, synchronous state machine 300 begins in IDLE2 301 and remains in this state, as long as second processor means 102 does not request access to bus means 103. Upon second processor means 102 requesting bus means 103, apparatus 200 transitions to either WAIT1 302 or PEND2 303 depending upon whether bus means 103 is in uninterruptable bus cycle. During an uninterruptable bus cycle, apparatus 200 remains in WAIT1 302. When the "locked" bus cycle ends, apparatus 200 transitions to PEND2 303.

PEND2 303 is the last state before second processor means 102 gains access to bus means 103. Apparatus 200 remains in PEND2 303 as long as bus means 103 is busy. While first processing means 101 is bus master, determining whether bus means 103 is busy is a function of state machine 310 which looks to the signals available from and sent to first processor means 101. Once bus means 103 is no longer busy or is about to be relinquished by first processor means 101, then apparatus 200 transitions to IDLE2 304.

Apparatus 200 remains in IDLE1 304, as long as first processor means 101 does not request access to bus means 103. Upon first processor means 101 requesting bus means 103, apparatus 200 transitions to either WAIT2 305 or PEND1 306 depending upon whether bus means 103 is in a locked bus cycle. During a locked bus cycle, apparatus 200 remains in WAIT2 305 until the locked bus cycle ends, when apparatus 200 transitions to PEND1 306.

PEND1 306 is the last state before first processor means 101 gains access to bus means 103. Apparatus 200 remains in PEND1 306 as long as bus means 103 is busy. While second processing means 102 is bus master determining whether bus means 103 is busy is a function of state machine 320. Once bus means 103 is no longer busy or is about to be relinquished by second processor means 102, apparatus 200 then transitions to IDLE2 301.

State machines 310 and 320 both indicate whether bus means 103 is busy. Bus means 103 is considered busy from the assertion of ADS by the processor means until return of RDY or BRDY from a slave device. State machines 310 and 320 also require BLAST from the bus master processing means to determine if an asserted BRDY is valid. Because state machines 310 and 320 need an extra clock tick before they register a new state, the transitions between PEND2 303 and IDLE1 304 and PEND1 306 and IDLE2 301, directly consider the same signals as state machines 310 and 320, such that transferring bus access can be accomplished as soon as practicable without causing bus contention.

The values generated by synchronous state machines 220 are output—on the fundamental system clock—to asynchronous state machines 230. In a preferred embodiment, wherein first and second processor means 101 and 102 are INTEL 486 microprocessors, asynchronous state machines 230 output two AHOLD signals, 1AHOLD 211 for first processor means 101 and 2AHOLD 212 for second processor means 102. In the INTEL 486 microprocessor family, AHOLD or address hold, is designed for internal cache invalidation to force the microprocessor to relinquish the address bus, such that an external master can assert an address on the processor. The INTEL protocol further requires the simultaneous assertion of EADS, or External Address Valid, to begin an internal cache line invalidation cycle. By asserting an AHOLD signal without an EADS signal, the set of address lines is relinquished "immediately" with no side effects to the internal cache. The only side-effect of asserting an AHOLD signal is causing the microprocessor to prevent a subsequent bus cycle at the end of the current bus cycle.

Apparatus 200 seeks to maximize bus utilization while providing clean arbitration resulting in no bus contention. Ideally, the completion of one processing device's bus cycle is immediately followed by the beginning of a bus cycle from the other processing device. However, in reality, signal hold times make this difficult. In particular, the address lines on an INTEL 486 DX/2 at 66 Mhz have a float delay time of up to twenty nanoseconds during which an address may be driven by the microprocessor after it should have been relinquished. This delay makes no contention contiguous bus cycles impossible under the normal INTEL bus cycle definition. By utilizing AHOLD control means 210 can delegate access to bus means 103 without concern of contention between the previous cycle address and the next address.

In a preferred embodiment utilizing the INTEL 486 bus definition, asynchronous state machine 230 may be implemented in either discrete logic or a PAL, such as GAL 16L8. The equations represented in true Boolean logic for a synchronous state machine 230 at:

1AHOLD=ADS2+ADS1+(BUSY2 * RDY/ * BRDY/)+(BUSY2 * RDY/ * BLAST/)+(BUSY2 * BLAST * PLOCK2)+ARB2.

2AHOLD=ADS2+ADS1+(BUSY1 * RDY/ * BRDY/)+(BUSY1 * RDY/ * BLAST/)+(BUSY1 * BLAST * PLOCK1)+ARB2/.

These equations result in both 1AHOLD 211 and 2AHOLD 212 being asserted on their respective processor means while either processor means asserts ADS, bus means 103 is busy with the other processor (i.e. 2AHOLD is asserted while first processor means 101 is using bus means 103, and vice versa) or the other processor is requesting access to bus means 103 ("ARB2"). Under the INTEL 486 bus definition, the assertion of AHOLD concurrent to ADS assertion has a pipelined effect, i.e. the response from the microprocessor means occurs at the next clock edge, such that the sets address of lines are relinquished. Thus, due to this pipeline effect, before the address lines are relinquished latch means 201 latches the appropriate address onto address bus 103a, utilizing LATCH_ADDRESS as described above. Thus, on every bus cycle the asserted address is latched on the address lines relinquished during the bus cycle.

Transferring access to bus means 103 is accomplished by continuing AHOLD. Continued assertion of AHOLD prevents the processing means from beginning a subsequent bus cycle. However, where AHOLD is asserted only during the first tick, a contiguous bus cycle may be started by the processing means. For instance where first processor means 101 has access to bus means 103, 1AHOLD 211 is asserted during an ADS assertion. 1AHOLD 211 may be maintained, thus preventing a subsequent bus cycle from first processing means 101, when synchronous state machine 300 is in PEND2 303. Once first processing means 101 no longer has access to bus means 103 (IDLE1 304; WAIT2 305 and PEND1 306), 1AHOLD 211 is maintained while bus means 103 is busy ("BUSY2").

In a preferred embodiment having at least one microprocessor with an internal cache, apparatus 200 further includes cache invalidation means 241 for causing the microprocessor to perform an internal cache invalidation cycle. Such internal cache invalidation cycles are provided for by the INTEL 486 microprocessor family. As mentioned above, as soon as AHOLD, an address, an EADS are simultaneously applied an invalidation cycle begins. Of course, if the data is not in the internal cache, no invalidation occurs. Inasmuch as AHOLD is almost always active in the present invention, only 1EADS/213 and 2EADS/214 need to be generated by cache invalidation means 241 cause a cache invalidation cycle. This may be accomplished using a synchronous discrete logic or PALs, such as a 20R4 GAL. The equations can be configured as follows using signals, as defined by INTEL:

2EADS=EADS+M/IO * D/C * W/R , CPU2/ * MPADS; 1EADS= EADS+M/IO * D/C * W/R , CPU2 * MPADS.

Thus, a cache invalidation cycle will be caused upon assertion of EADS by an external master device or upon a memory write being initiated by the other processor means.

In operation, the bus arbitration apparatus, begins by providing the first processing device access to the bus means. During such time as a processing device has access to the bus means it may or may not utilize the bus means. If the bus means is utilized it is considered "busy" by the apparatus until the bus cycle has completed or is about to complete. The apparatus determines whether the bus means is busy by utilizing signals from the first processing device and the bus means.

While the first processing device has access to the bus, the apparatus latches the address on the first set of address lines into the latch on every bus cycle, such that the proper bus definition is maintained for the entire bus cycle. Then the apparatus causes the first processing device to immediately relinquish the first set of address lines. Thus, the first processing device is allowed to complete the current bus cycle while the first set of address lines "settle down" within their specified hold time.

These steps are repeated until the bus means is not busy and the second processing device requests access to the bus means. When the second processing device requests such access, the apparatus prevents the first processing device from beginning a subsequent bus cycle. This step, as well as the step of relinquishing the address lines is achieved, in a preferred embodiment utilizing INTEL 486 microprocessors, using the AHOLD signal. As long as AHOLD is asserted on the first processor it can not begin a bus cycle, thus providing the second processing device exclusive access to the bus means. Of course, while the first processing device had access to the bus means, AHOLD was continually asserted upon the second processing device to prevent the second processing device from beginning a bus cycle.

In this embodiment, the address lines of the first and second processing devices may be tied together on the non-bus means side of the latch means, so as to allow for potential cache invalidations between the first and second processing devices. Also in a preferred embodiment, the latch means is bidirectional, such that operations by other system masters, such as a DMA transfer can result in an internal cache invalidation in the first and/or second processing devices. The inventor contemplates the use of this bus means in association with different processing devices, wherein intervening logic, buffers and delays may be required to ensure proper operation of the apparatus— all of which would be known to those of ordinary skill in the art to which the present invention relates. For instance, address bus request may be utilized to control a tri-state buffer to pull the processing device off the address bus and halt the processing device at the end of its bus cycle.

The foregoing description and drawings merely explain and illustrate the invention and the invention is not limited thereto except insofar as the appended claims are so limited and as those skilled in the art who have the disclosure before them will be able to make modifications and variations therein without departing from the scope of the invention.

What is claimed is:

1. A high speed/low overhead bus arbitration apparatus for allocating system bus mastership in a system including, bus means for providing a central communication link between devices within said system, said bus means including an address bus, data bus, and control bus, a first processing device executing instructions and manipulating data, said first processing device having a first set of address lines, a first set of data lines and a first set of control lines containing first control signals, said first control signals indicating status of said first processing device, a second processing device executing instructions and manipulating data, said second processing device having a second set of address lines, a second set of data lines and a second set of control lines containing second control signals, said second control signals indicating status of said second processing device, said high speed/low overhead bus arbitration apparatus comprising:

control means for providing one of said first and second processing devices ability to access said address, data and control busses, and for alternately transferring said ability to access said bus means between said first and second processing devices based directly upon said statuses of said first and second processing devices as indicated by said first and second control signals;

multiplexer means for connecting either said first set or said second set of control lines to said control bus based upon the state of said control means; and latch means for alternatively passing through to, or latching onto, said address bus, based upon the state of said system, an address, said address being driven exclusively by either of said first or second processing devices based upon the state of said control means such that there is no contention between a first address on said first set of address lines and a second address on said second set of address lines.

2. The invention according to claim 1 wherein said first set and second set of address lines are electrically connected together and to said latch means.

3. The invention according to claim 2 wherein said first processing device is a microprocessor having an internal cache.

4. The invention according to claim 3 wherein said control bus includes an EADS control signal, said high speed/low overhead bus arbitration apparatus further includes cache invalidation means for causing said first processor device to perform an internal cache invalidation cycle.

5. The invention according to claim 4 wherein said control bus further contains HOLD and HLDA control signals, and said latch means is bidirectional such that an address on said address bus is passed through to said connected first and second address lines on an external master transfer cycle.

6. The invention according to claim 4 wherein said second processing device is a microprocessor having an internal cache.

7. The invention according to claim 6 wherein said cache invalidation means further serves to cause said second processing device to perform an internal cache invalidation cycle.

8. The invention according to claim 1 wherein said first processing device is a microprocessor having an internal cache.

9. The invention according to claim 8 wherein said high speed/low overhead bus arbitration apparatus further includes cache invalidation means for causing said first microprocessor to perform an internal cache invalidation cycle.

10. A high speed/low overhead bus arbitration apparatus for allocating system bus mastership in a system including, a system bus having an address bus, data bus, and control bus, said control bus containing at least BREQ, LOCK, PLOCK, ADS, RDY, BRDY, BLAST and AHOLD control signals and a fundamental system clock, said control signals substantially conforming to the bus definition utilized in association with INTEL 486 microprocessor family, a first microprocessor executing instructions and manipulating data, said first microprocessor device having a first set of address lines, a first set of data lines and a first set of control lines containing first control signals, said first control signals indicating status of said first microprocessor, a second microprocessor executing instructions and manipulating data, said second microprocessor having a second set of address lines, a second set of data lines and a second set of control lines containing second control signals, said second control signals indicating status of said second microprocessor, said high speed/low overhead bus arbitration apparatus comprising:

control means for providing one of said first and second microprocessors ability to access said address, data and control busses, and for alternately transferring said ability to access said bus means between said first and second processing devices based directly upon said statuses of said first and second microprocessors as indicated by said first and second control signals;

multiplexer means for connecting either said first set or said second set of control lines to said control bus based upon the state of said control means; and latch means for alternatively passing through to or latching onto said address bus, based upon the state of said system, an address, said address being driven exclusively by either of said first or second microprocessor based upon the state of said control means such that there is no contention between a first address on said first set of address lines and a second address on said second set of address lines.

11. The invention according to claim 10 wherein said first set and second set of address lines are electrically connected together and to said latch means.

12. The invention according to claim 11 wherein said first microprocessor has an internal cache and said control bus further includes an EADS control signal, said high speed/ low overhead bus arbitration apparatus further includes cache invalidation means for causing said first microprocessor to perform an internal cache invalidation cycle.

13. The invention according to claim 12 wherein said control bus further contains HOLD and HLDA control signals, and said latch means is bidirectional such that an address on said address bus is passed through to said connected first and second address lines on an external master transfer cycle.

14. The invention according to claim 12 wherein said second microprocessor has an internal cache, said cache invalidation means further serves to cause said second microprocessor to perform an internal cache invalidation cycle.

15. The invention according to claim 10 wherein said first microprocessor has an internal cache, said high speed/low overhead bus arbitration apparatus further includes cache invalidation means for causing said second microprocessor to perform an internal cache invalidation cycle.

16. A multiprocessor computer apparatus for executing instructions and manipulating data, said multiprocessor computer apparatus receiving interrupts from an interrupt controller, and said multiprocessor computer apparatus further being connected to a system bus having an address bus, data bus and control bus, said control bus conforming to the bus definition utilized in association with the INTEL 486 microprocessor family, said multiprocessor computer apparatus comprising:

first processor means for executing instructions and manipulating data, said first processor means having a first set of address lines, a first set of data lines and a first set of control lines;

second processor means for executing instructions and manipulating data, said second processor means having a second set of address lines, a second set of data lines and a second set of control lines;

said first set of data lines and said second set of data lines being electrically connected to said data bus;

said first set of address lines being electrically connected to said second set of address lines to form a unitary set of address lines;

latch means for latching an address on said unitary address lines onto said address bus only upon assertion of a latch signal, said latch means further serving to pass the address on said unitary address lines onto said address bus while said latch signal is not being asserted;

multiplexer means receiving as inputs said first set of control lines, said second set of control lines and a select signal, said multiplexer means serving to electrically connect one of said first and second set of control lines to a portion of said control bus as determined by said select signal; and control means for providing each of said first and second processor means alternate access to said system bus, said control means generating said select signal, said latch signal, a first AHOLD signal and a second AHOLD signal, said first and second AHOLD signals being operably connected to said first and second processor means, respectively, said first AHOLD signal forcing said first processor means to immediately relinquish said first set of address lines during a first bus cycle and to prevent a subsequent bus cycle at the end of said first bus cycle, said second AHOLD signal forcing said second processor means to immediately relinquish said second set of address lines during a second bus cycle and to prevent a subsequent bus cycle at the end of said second bus cycle.

17. The invention according to claim 16 wherein said first processor means is a microprocessor from the INTEL 486 family, having an internal cache.

18. The invention according to claim 17 wherein said multiprocessor computer apparatus further includes cache invalidation means for causing said first processor means to perform an internal cache invalidation cycle.

19. The invention according to claim 18 wherein said latch means is bidirectional such that an address on said address bus can be passed through to said unitary address lines and, in turn, onto the address pins of said first and second processor means.

20. The invention according to claim 18 wherein said second processor means is a microprocessor from the INTEL 486 family having an internal cache and said cache invalidation means further serves cause said second processor means to perform an internal cache invalidation cycle.

21. A method for low overhead, high speed bus arbitration for use in a system including, bus means for providing a central communication link between devices within the system, the bus means including an address bus, data bus, and control bus, a first processing device executing instructions and manipulating data, the first processing device having a first set of address lines, a first set of data lines and a first set of control lines, a second processing device executing instructions and manipulating data, the second processing device having a second set of address lines, a second set of data lines and a second set of control lines, a multiplexer for connecting either the first set or the second set of control lines onto the control bus, a latch for alternately latching onto and passing through to the address bus an address from one of the first or second sets of address lines, the method comprising the steps of:

(a) releasing the first processing device such that it can access the bus means;

(b) beginning a current bus cycle on the bus means driven by the first processing device;

(c) latching the address on the first set of address lines into the latch;

(d) causing the first processing device to immediately relinquish the first set of address lines after the step of latching the first set of address lines;

(e) anticipating a next bus cycle, during the current bus cycle, simultaneously with or after the step of causing the first processing device to immediately relinquish, utilizing signals from the second processing device, including the sub-steps of:

restricting the first processing device such that it can not access the bus means after completion of the current bus cycle, releasing the second processing device, upon determining that the second processing device has requested access to the bus means, such that it can access the bus means;

(f) repeating steps (a) through (e) for the next bus cycle, until the second processing device requests access to the bus means;

(g) beginning the next bus cycle, as a current bus cycle, on the bus means driven by the second processing device;

(h) latching the address on the second set of address lines into the latch;

(i) causing the second processing device to immediately relinquish the first set of address lines after the step of latching the second set of address lines;

(j) anticipating a next bus cycle, during the current bus cycle, simultaneously with or after the step of causing the second processing device to immediately relinquish, utilizing signals from the first processing device, including the substeps of:

restricting the second processing device such that it can not access the bus means after completion of the current bus cycle, releasing the first processing device, upon determining that the first processing device has requested access to the bus means, such that it can access the bus means;

(k) repeating steps (g) through (j) for the next bus cycle until the first processing device requests access to the bus means; and (l) returning to step (a) and repeating steps (a) through (l) until the system is reset or powered down.

22. A method for sharing a system bus between two processing devices with low overhead and high speed arbitration, in a system including, a system bus having an address bus, data bus and control bus, the control bus at least contains BREQ, LOCK, PLOCK, ADS, BLAST, RDY, BRDY and AHOLD control signals and a fundamental system clock, the control signals substantially conforming to the bus definition utilized in association with INTEL 486 microprocessors, a first processing device executing instructions and manipulating data, the first processing device having a first set of address lines, a first set of data lines and a first set of control lines, a second processing device executing instructions and manipulating data, the second processing device having a second set of address lines, a second set of data lines and a second set of control lines, a multiplexer for selecting either the first set or the second set of control lines to be output onto the control bus, a latch for alternately latching onto and passing through to the address bus an address, the address resulting from the first and second sets of address lines being electrically connected together as inputs to the latch, the latch being further connected to the address bus, the method comprising the steps of:

(a) providing the first processing device access to the system bus for a current bus cycle;

(b) asserting a second AHOLD signal to the second processing device, such that the second processor device can not begin a bus cycle;

(c) latching the address on the first set of address lines into the latch;

(d) asserting a first AHOLD signal to the first processing device such that the first processing device immediately relinquishes the first set of address lines after the step of latching the first set of address lines;

(e) removing the first AHOLD signal from the first processing device when the second processing device is not requesting the system bus;

(f) repeating steps (a) through (e) for the next bus cycle until the second processing device requests the system bus;

(g) removing the second AHOLD signal on the second processing device after the step of asserting the first AHOLD during the current bus cycle, such that the second processing device can access the system bus on the next bus cycle;

(h) providing the second processing device access to the system bus for the next bus cycle;

(i) latching the address on the second set of address lines into the latch;

(j) asserting the second AHOLD signal to the second processing device, such that the second processing device immediately relinquishes the second set of address line after the step of latching the second set of address lines;

(k) removing the Second AHOLD signal from the second processing device when the first processing device is not requesting the system bus;

(l) repeating steps (g) through (k) until the first processing device requests the system bus;

(m) removing the first AHOLD signal on the first processing device, after the step of asserting the second AHOLD during the current bus cycle, such that the first processing device can access the system bus on the next bus cycle;

(n) returning to step (a) with the next bus cycle as the current bus cycle and repeating steps (a) through (n) until the system is reset or powered down.

23. A high speed/low overhead bus arbitration apparatus for allocating system bus mastership in a system including, bus means for providing a central communication link between devices within said system, said bus means including an address bus, data bus, and control bus, a first processing device executing instructions and manipulating data, said first processing device having a first set of address lines, a first set of data lines and a first set of control lines containing first control signals, said first control signals indicating status of said first processing device, a second processing device executing instructions and manipulating data, said second processing device having a second set of address lines, a second set of data lines and a second set of control lines containing second control signals, said second control signals indicating status of said second processing device, said high speed/low overhead bus arbitration apparatus comprising:

control means for controlling connections between each of said first and second processing devices and said address and control busses for a current bus cycle and anticipating the connections for a next bus cycle based directly upon said statuses of said first and second microprocessors as indicated by said first and second control signals;

multiplexer means for connecting either said first set or said second set of control lines to said control bus based upon the state of said control means; and latch means for alternatively passing through to or latching onto said address bus, based upon the state of said system, an address, said address being driven exclusively by either of said first or second processing devices based upon the state of said control means such that there is no contention between a first address on said first set of address lines and a second address on said second set of address lines.

24. The invention according to claim 23 wherein at least one of said first and second processing devices is a microprocessor having an internal cache, said high speed/low overhead bus arbitration apparatus further includes cache invalidation means for causing said at least one of said first and second processing devices to perform an internal cache invalidation cycle.

25. The method according to claim 21 wherein the step of anticipating a next bus cycle after the step of causing the first processing device to immediately relinquish further includes the substep of preventing the step of releasing the second processing device when the first processing device is executing an uninterruptable bus cycle and the step of anticipating a next bus cycle after the step of causing the second processing device to immediately relinquish further includes the substep of preventing the step of releasing the first processing device when the second processing device is executing an uninterruptable bus cycle.

26. The method according to claim 22 wherein the step of anticipating a next bus cycle after the step of causing the first processing device to immediately relinquish further includes the substep of preventing the step of releasing the second processing device when the first processing device is executing an uninterruptable bus cycle and the step of anticipating a next bus cycle after the step of causing the second processing device to immediately relinquish further includes the substep of preventing the step of releasing the first processing device when the second processing device is executing an uninterruptable bus cycle.

* * * * *

UNITED STATES PATENT AND TRADEMARK OFFICE
CERTIFICATE OF CORRECTION

PATENT NO. : 5,455,912
DATED : October 3, 1995
INVENTOR(S) : Thomas E. Ludwig

It is certified that error appears in the above-identified patent and that said Letters Patent is hereby corrected as shown below:

Col. 1, Line 45    Before "bus definition" add — 486 —.

Col. 9, Line 38 &
        39    After "W/R" delete "," and insert instead — * —.

Signed and Sealed this

Twenty-sixth Day of March, 1996

Attest:

BRUCE LEHMAN

*Attesting Officer*    *Commissioner of Patents and Trademarks*